(12) United States Patent
Kurapati et al.

(10) Patent No.: US 12,682,379 B2
(45) Date of Patent: Jul. 14, 2026

(54) CUSTOMER PREFERENCE DRIVEN VEHICLE SUPPLY MANAGEMENT SYSTEM

(71) Applicant: TOYOTA MOTOR NORTH AMERICA, INC., Plano, TX (US)

(72) Inventors: Ram Kurapati, Southlake, TX (US); Munish Goyal, Yorktown Heights, NY (US); Muttu Vastrad, Frisco, TX (US); Audrey Mito, The Colony, TX (US); Smail Haddad, Plano, TX (US); Doug S. Campbell, McKinney, TX (US); Philip W. Ryan, Frisco, TX (US); Ramesh Gangadharan, Suwanee, GA (US); Mai Miller, Celina, TX (US); Srinivas Prasad, Plano, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 94 days.

(21) Appl. No.: 18/732,554

(22) Filed: Jun. 3, 2024

(65) Prior Publication Data

US 2025/0371592 A1     Dec. 4, 2025

(51) Int. Cl.
G06Q 30/00        (2023.01)
G06Q 10/087       (2023.01)
G06Q 30/0601      (2023.01)

(52) U.S. Cl.
CPC ....... *G06Q 30/0605* (2013.01); *G06Q 10/087* (2013.01)

(58) Field of Classification Search
CPC .................. G06Q 30/0605; G06Q 10/087
(Continued)

(56) References Cited

U.S. PATENT DOCUMENTS 10,846,534 B1 * 11/2020 Furlan ................... G01C 21/20
11,010,815 B1    5/2021 Chow et al.
(Continued)

FOREIGN PATENT DOCUMENTS

CN        113240482 A     8/2021

OTHER PUBLICATIONS

Sanderson: "Unveiling Car Specs with Multidimensional Scaling in R," r-bloggers.com; Apr. 3, 2024; 4pgs. (Year: 2024).*

*Primary Examiner* — Robert M Pond
(74) *Attorney, Agent, or Firm* — HAYNES AND BOONE, LLP

(57)            ABSTRACT

A system includes an application configured to, based on user inputs, generate a target vehicle specification, and a database including a collection of inventory specifications of vehicles in a vehicle inventory. The system also includes a spec encoder configured to: encode the target vehicle specification as a first code; encode the collection of inventory specifications as a collection of second codes; and map the target vehicle specification and inventory specifications into a multidimensional space. The multidimensional space includes one dimension for each specification category. A preference class vector includes a weight for each dimension. A matching engine, based on the preference class vector, defines a search neighborhood around the target specification in the multidimensional space; identifies inventory specifications that fall within the search neighborhood, computes match scores for the identified vehicles; and reports the match scores and corresponding vehicles.

20 Claims, 11 Drawing Sheets

(58) Field of Classification Search
USPC ...................................................... 705/26, 27
See application file for complete search history.

(56) References Cited

U.S. PATENT DOCUMENTS

| 11,151,461 | B2 | 10/2021 | Miller et al. |
| 11,151,628 | B2 | 10/2021 | Wylie et al. |
| 11,561,106 | B2 | 1/2023 | Dingli |
| 2020/0364564 | A1* | 11/2020 | Barnwal ................. G06N 3/08 |
| 2023/0140637 | A1 | 5/2023 | Dagley et al. |
| 2023/0394892 | A1* | 12/2023 | Zhou ............... G06K 19/06037 |
| 2024/0242287 | A1* | 7/2024 | Rice ................... G06F 3/04815 |

\* cited by examiner 221,330

MANUFACTURER
520

510

MAIN
530

560
MISCELLANEOUS

510

540
OPTION

550
COLOR

600

185

210 — CUSTOMER SALES ORDER TARGET SR CODE

SPECIFICATION MATCH AND SEARCH ENGINE

MATCH RESULTS MATCH SR CODE + MATCH SCORE — 610

194 — TIGHTNESS UPDATE MODEL
*EXAMPLE MODEL:*
$TIGHTNESS\ (SR_1) \leftarrow (1\text{-}LR) * TIGHTNESS\ (SR_1) + LR * (1\text{-}max(MatchScore))$
*WHERE LR: TUNABLE LEARNING RATE*

810,230

810,230

1050

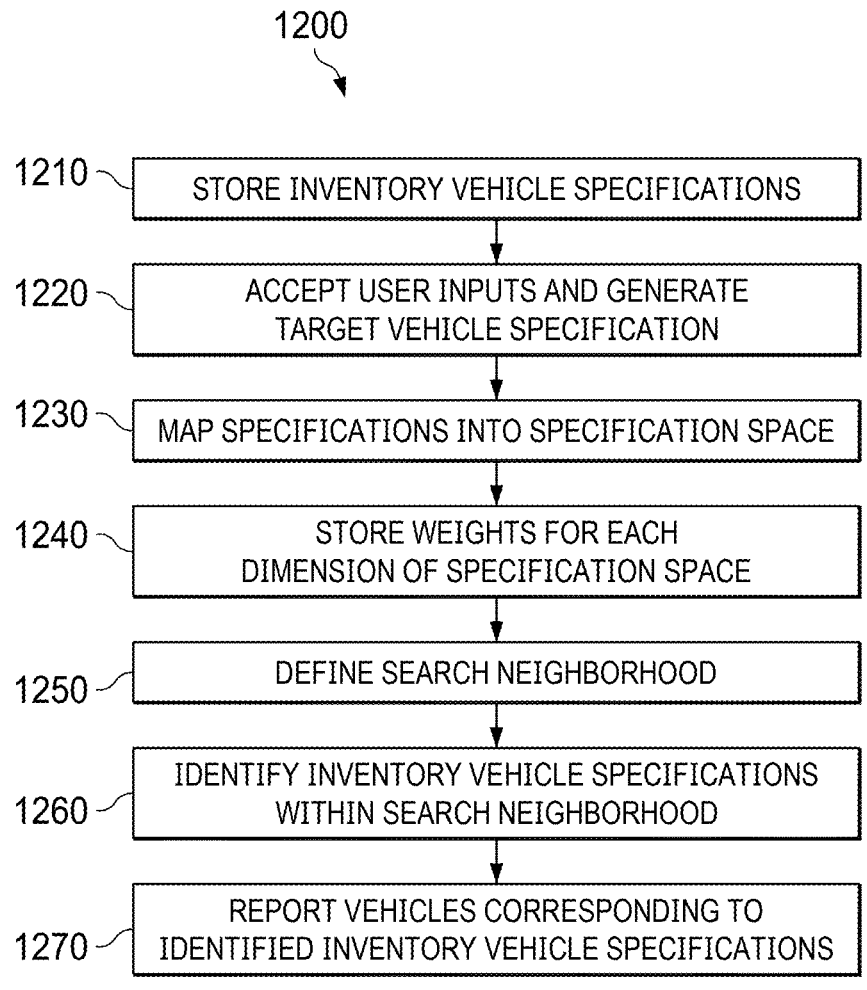

1200

1210 — STORE INVENTORY VEHICLE SPECIFICATIONS

1220 — ACCEPT USER INPUTS AND GENERATE
TARGET VEHICLE SPECIFICATION

1230 — MAP SPECIFICATIONS INTO SPECIFICATION SPACE

1240 — STORE WEIGHTS FOR EACH
DIMENSION OF SPECIFICATION SPACE

1250 — DEFINE SEARCH NEIGHBORHOOD

1260 — IDENTIFY INVENTORY VEHICLE SPECIFICATIONS
WITHIN SEARCH NEIGHBORHOOD

1270 — REPORT VEHICLES CORRESPONDING TO
IDENTIFIED INVENTORY VEHICLE SPECIFICATIONS

FIG. 12

CUSTOMER PREFERENCE DRIVEN VEHICLE SUPPLY MANAGEMENT SYSTEM

TECHNICAL FIELD

The subject matter described herein relates to systems, devices, and methods for managing vehicle supply and demand. This vehicle supply management system has particular, but not exclusive utility for supply chain management for cars and trucks.

BACKGROUND

Today, it is not unusual for a vehicle brand and model to have hundreds options or specifications for its configuration. The options or specifications include not only exterior color(s), interior color(s), engine type, and transmission type, but also accessories, trim, option packages, etc. The possible permutations and combinations may thus be more numerous than the number of vehicles actually produced. It can therefore be difficult for a dealer or manufacturer to manage these vehicle specifications, which are continuously changing and growing due to rapid technological advancements. At the same time, customers are becoming more sophisticated, and want to find vehicles online that match their detailed requirements, preferences, and utility functions in a way that is easy to understand. Given these evolving customer and technological needs, manufacturers are finding it difficult to incorporate these personalized preferences into their demand and supply planning and management.

It should therefore be appreciated that current vehicle supply and demand management systems have numerous drawbacks, including slow response, limited customer satisfaction, and otherwise. Accordingly, a need exists for improved vehicle supply management systems that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a vehicle supply management system. The vehicle supply management system disclosed herein has particular, but not exclusive, utility for supply chain management for cars and trucks. The vehicle supply management system allows purchasers to find the available vehicles that most closely match their preferences, and allows manufacturers to ship and manufacture vehicles based on detailed knowledge of gaps and/or gluts in the current vehicle supply.

The vehicle supply management system includes a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including a user application configured to, based on inputs from a user, generate a target vehicle specification. The system also includes a database that may include a plurality of inventory specifications of a respective plurality of vehicles in a vehicle inventory. The system also includes a spec encoder configured to: encode the target vehicle specification as a first code; encode the plurality of inventory specifications as a plurality of respective second codes; and map the target vehicle specification and the plurality of inventory specifications into a multidimensional specification space, where the multidimensional specification space includes one dimension for each specification category of the target vehicle specification. The system also includes a preference class vector that may include a respective weight for each dimension of the multidimensional specification space. The system also includes a matching engine configured to: based on the preference class vector, define a search neighborhood around the target vehicle specification in the multidimensional specification space; identify inventory specifications of the plurality of inventory specifications that fall within the search neighborhood; and for each identified inventory specification: compute a match score; and report, to the user, the match score and the vehicle corresponding to the identified inventory specification. Other embodiments of this aspect include corresponding computer systems, apparatus, and computer programs recorded on one or more computer storage devices, each configured to perform the actions of the methods.

Implementations may include one or more of the following features. In some embodiments, the first code and the plurality of second codes are SR codes. In some embodiments, the first code and the plurality of second codes are hexadecimal strings. In some embodiments, the specification categories of the target vehicle specification include at least one of an exterior color, an interior color, an engine type, a transmission type, an accessory, or a trim package. In some embodiments, the system may include a user feedback module configured to: receive user feedback regarding the vehicles corresponding to the identified inventory specifications; and based on the user feedback, update the preference class vector. In some embodiments, the system may include a specification manager configured to, based on changes in the vehicle inventory, update the database may include the plurality of inventory specifications. In some embodiments, the system may include a tightness updater configured to: based on the mapped target vehicle specification, the mapped plurality of inventory specifications, and the search neighborhood, compute a tightness for the target vehicle specification; and report the tightness to the user, or to a dealer or manufacturer. In some embodiments, the system may include gap glut analyzer configured to: based on a plurality of target vehicle specifications and the plurality of inventory specifications, compute a gap-glut estimate; and report the gap-glut estimate to a dealer or manufacturer. In some embodiments, the system may include a goal maximizer configured to, based on the gap-glut estimate: request changes to the vehicle inventory; or adjust prices of at least some vehicles in the vehicle inventory. In some embodiments, the user application is a smartphone application or web application. Implementations of the described techniques may include hardware, a method or process, or computer software on a computer-accessible medium.

One general aspect includes a non-transitory computer-readable medium containing instructions for: with a user application, based on inputs from a user, generating a target vehicle specification; with a database stored in a first memory, storing a plurality of inventory specifications of a respective plurality of vehicles in a vehicle inventory; with a spec encoder: encoding the target vehicle specification as a first code; encoding the plurality of inventory specifications as a plurality of respective second codes; and mapping the target vehicle specification and the plurality of inventory specifications into a multidimensional specification space, where the multidimensional specification space includes one dimension for each specification category of the target vehicle specification; with a preference class vector stored in a second memory, storing a respective weight for each dimension of the multidimensional specification space; with a matching engine: based on the preference class vector, defining a search neighborhood around the target vehicle specification in the multidimensional specification space; identifying inventory specifications of the plurality of inventory specifications that fall within the search neighborhood; and for each identified inventory specification: computing a match score; and reporting, to the user, the match score and the vehicle corresponding to the identified inventory specification. Other embodiments of this aspect include corresponding computer systems, apparatus, and computer programs recorded on one or more computer storage devices, each configured to perform the actions of the methods.

Implementations may include one or more of the following features. In some embodiments, the first code and the plurality of second codes are SR codes. In some embodiments, the first code and the plurality of second codes are hexadecimal strings. In some embodiments, the specification categories of the target vehicle specification include at least one of an exterior color, an interior color, an engine type, a transmission type, an accessory, or a trim package. In some embodiments, the instructions further may include, with a user feedback module: receiving user feedback regarding the vehicles corresponding to the identified inventory specifications; and based on the user feedback, updating the preference class vector. In some embodiments, the instructions further may include, with a specification manager, based on changes in the vehicle inventory, updating the database may include the plurality of inventory specifications. In some embodiments, the instructions further may include, with a tightness updater: based on the mapped target vehicle specification, the mapped plurality of inventory specifications, and the search neighborhood, computing a tightness for the target vehicle specification; and reporting the tightness to the user, or to a dealer or manufacturer. In some embodiments, the instructions further may include, with a gap glut analyzer: based on a plurality of target vehicle specifications and the plurality of inventory specifications, computing a gap-glut estimate; and reporting the gap-glut estimate to a dealer or manufacturer. In some embodiments, the instructions further may include, with a goal maximizer, based on the gap-glut estimate: requesting changes to the vehicle inventory; or adjusting prices of at least some vehicles in the vehicle inventory. Implementations of the described techniques may include hardware, a method or process, or computer software on a computer-accessible medium.

One general aspect includes a computer implemented method. The computer implemented method includes defining a vehicle specification format that may include a plurality of specification categories. The method also includes defining a specification code format that may include at least one digit for each specification category of the plurality of specification categories. The method also includes receiving a vehicle specification in the vehicle specification format. The method also includes mapping the vehicle specification into the specification code format. The method also includes representing the mapped vehicle specification as a two-dimensional SR code. The method also includes storing the two-dimensional SR code. The method also includes receiving a user request. The method also includes, based on the user request, electronically transmitting the two-dimensional SR code to a second processor. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the vehicle supply management system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 12 is a schematic, diagrammatic representation, in flow diagram form, of an example vehicle matching method, in accordance with at least one embodiment of the present disclosure.

DETAILED DESCRIPTION

Figure 1:
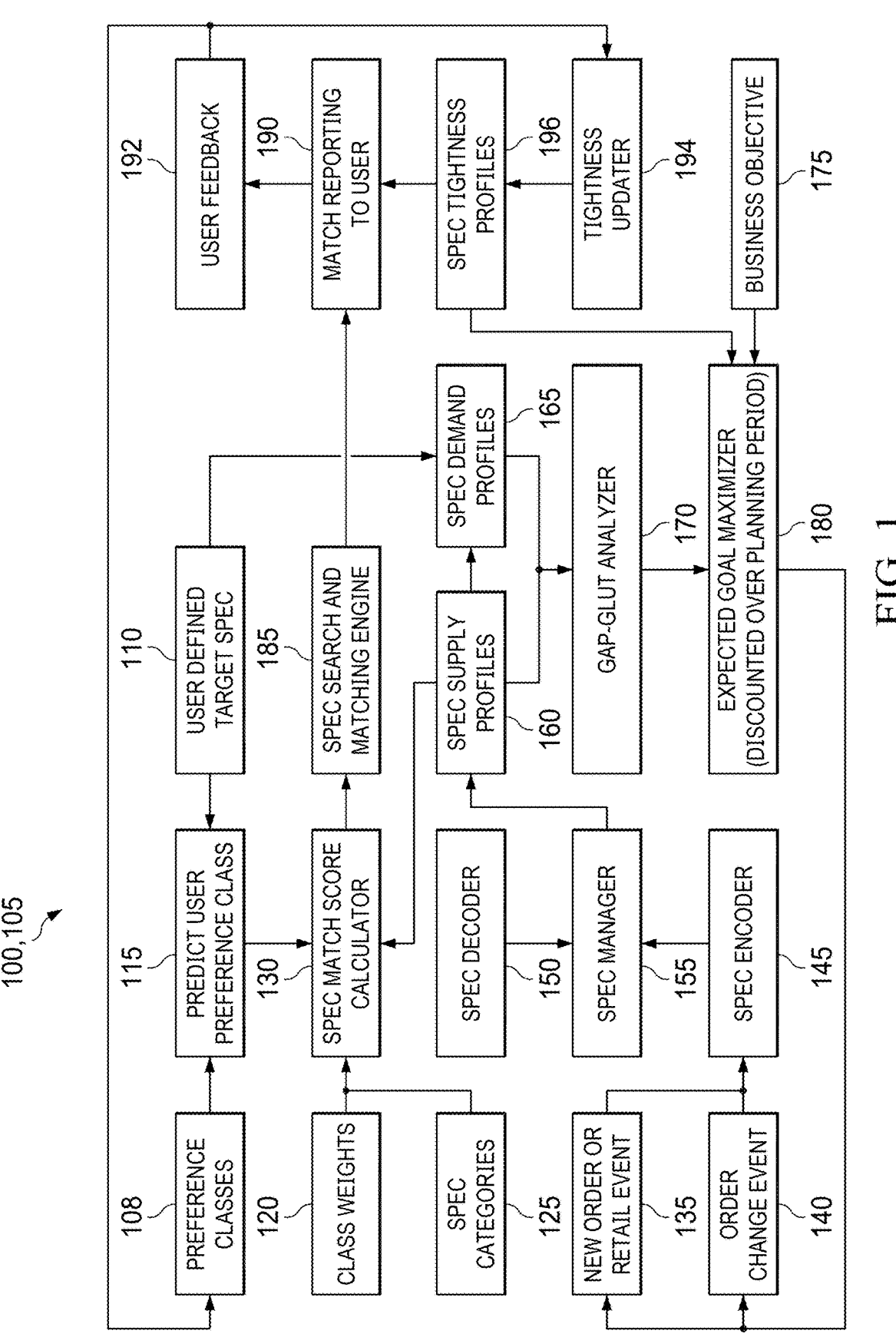
FIG. 1 is a schematic, diagrammatic representation, in hybrid flow diagram and block diagram form, of an example vehicle supply management method, executable by a vehicle supply management system, in accordance with at least one embodiment of the present disclosure.

In accordance with at least one embodiment of the present disclosure, a vehicle supply management system is provided which allows purchasers to find the available vehicles that most closely match their preferences, and allows manufacturers to manufacture and ship vehicles based on detailed knowledge of gaps and/or gluts in the current vehicle supply, at the level of configuration dimensions, utilizing real-time capture and aggregation of individual utility functions.

There is no utility or application that addresses the following business needs:

1. Capture, encode, transmit, display, decode vehicle specification information using a universal specification record (SR) code. The SR code may be a two-dimensional bar code that is similar in some respects to a quick response (QR) code.
2. On-demand personalized consumer-utility based search and matching of encoded vehicle specifications against a user defined target specification, presenting the user with vehicles most similar to the specification, and receiving real-time feedback for adaptive learning of customer preferences, and the weightings thereof.
3. Estimate dynamic market tightness of any given configurations using customer-specific utilities, preferences, desired specification, and matched specification outcomes.
4. Estimate gaps and gluts of any specification in the current vehicle supply, using customer-preference-driven neighborhood demand profiles and supply profiles.
5. Match and score any two vehicles based on their respective specifications using SR code scanning from a standard mobile app.

The present disclosure provides a system and method for a utility or application that provides these features, and thus provides a new automotive standard for sharing, consumption, and transmission of specification information. Today, vehicle specifications are stored in a key-value store. Option specification information is highly sparse and continuously growing, making it very hard to store and process in an effective manner. The vehicle supply management system can provide user-driven vehicle specification matching and scoring based on user specified preferences and utilities, and can analyze demand and supply gap/glut by incorporating user preferences on vehicle specification sets, and aids in planning to actively manage the gaps and/or gluts in the current vehicle supply.

This vehicle supply management system transforms the specification information capture, dissemination and processing by leveraging the sparse information structure and performing on-line, low-dimensional embedding in terms of an SR code. This low dimensional embedding allows efficient storage and dissemination. Any loss of information during decoding can be recaptured using an effective rules engine that facilitates the accuracy of decoded information.

The vehicle supply management system of the present disclosure uses a real-time, user-feedback-based classification system to identify a user preference/utility class, which is then mapped to a specification category and class-defined weight functions. Given a user-defined target vehicle specification, the system performs the low-dimensional embedding of this target specification and stores it in the local system (e.g., an app on the user's mobile device, or a web app accessible from a laptop, etc.). A vehicle is displayed with its specification SR code. When a vehicle is selected, the calculator first computes a vector-valued function of the bit-wise difference (logical and/or/xor) between the target specification SR code and the selected vehicle's SR code. Each computed value is mapped to a specification category. The class- and category-dependent weights are then multiplied to appropriate computed values and aggregated to form a match score, which is displayed to the user. The user's feedback is evaluated and used to update the class prediction module.

The vehicle supply management system uses the target specification, customer preferences and the matched vehicle specification codes to compute and update a tightness factor, which describes demand and supply at the regional level for each target specification. The tightness is high when the match scores are consistently low, indicating low supply to customer demand specification and vice versa. As the supply situation changes or demand declines, it is expected that the tightness factor will decrease. The tightness factor is used to control the display of match results to the user, thus providing active management of market demand for certain high-demand specifications. This control is applied to keep the tightness ranges within certain specified threshold ranges.

The vehicle supply management system uses the preference class and population estimates for each preference class to evaluate expected specification level gap and glut over the planning horizon. Specification category weights for the class define a smoothening kernel that is used to evaluate estimated demand profile in a specification space (e.g., a multidimensional space with one axis per vehicle option or specification). Similarly, a supply profile is created in the specification space, given the dealer stock and pipeline vehicles. The gap and glut is then computed using the difference between the demand profile and supply profile within the specification space.

The present disclosure aids substantially in the buying and selling of vehicles, by matching customer demand to available vehicles, as well as providing detailed information about in-demand vehicle specs or options that should be added to the available supply. These features are accomplished by improving the encoding, decoding, and analysis of vehicle spec information. Implemented on processors in communication with a user and a database, the vehicle supply management system disclosed herein provides practical improvements in vehicle supply chain management. This improved knowledge of the relationship between customer demand and available supply allows each user to obtain the vehicle closest to their needs, without the normally routine need to custom-manufacture a vehicle to meet customer's specifications, and/or to match customers with vehicles that do not meet all of their specifications. This unconventional approach improves the functioning of the supply chain management computers, by reducing the amount of computation required to match vehicles to customers, and by improving the accuracy of the matches.

The vehicle supply management system may be implemented as a process at least partially viewable on a display, and operated by a control process executing on a processor that accepts user inputs from a keyboard, mouse, or touchscreen interface, and that is in communication with one or more databases. In that regard, the control process performs certain specific operations in response to different inputs or selections made at different times. Outputs of the vehicle supply management system may be printed, shown on a display, or otherwise communicated to human operators. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the vehicle supply management system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic, diagrammatic representation, in hybrid flow diagram and block diagram form, of an example vehicle supply management method 100, executable by a vehicle supply management system 105, in accordance with at least one embodiment of the present disclosure. It is understood that the blocks of method 100 may be performed in a different order than shown in FIG. 1, additional blocks can be provided before, during, and after the steps, and/or some of the blocks described can be replaced or eliminated in other embodiments. One or more of blocks of the method 100 can be carried by one or more devices and/or systems described herein, such as components of the system 105 and/or processor circuit 1050.

The method 100 begins with preference classes 108 and a user-defined target spec 110, the details of which are provided below. These are received by a prediction engine 115 that predicts the user preference class, which is then passed to a spec score match calculator 130. The spec score match calculator also has access to class weights 120, spec categories 125, and spec supply profiles 160 (e.g. profiles of the currently available vehicles), and produces a score describing how well any given vehicle matches the user-defined target spec 110. These scores are then passed to a spec search and matching engine 185, which passes vehicle matches to a reporting module 190. User feedback 192 (e.g. via a user feedback nodule) is then collected, and passed to a tightness updates 194, as well as being used to update the preference classes 108 (e.g., the weights for each specification, as described below). The tightness updater 194 updates the spec tightness profiles 196, which may be passed to the reporting module 190. Spec tightness profiles 196 are also passed, along with business objectives, to the expected goal maximizer 180, which may for example determine which vehicles to manufacture in order to reduce gaps and gluts.

To update the spec supply profiles 160, new order events 135 and order change events 140 are fed to a spec manager 155, which receives information from a spec encoder 145 and a spec decoder 150, and which updates the spec supply profiles 160. The user-defined target spec is also used to update spec demand profiles 165. Both the supply profiles 160 and the demand profiles 165 are fed to the gap-glut analyzer 170, whose outputs are received by the goal maximizer 180, whose outputs may include new order events 135 and new order change events 140.

Flow diagrams and block diagrams are provided herein for exemplary purposes; a person of ordinary skill in the art will recognize myriad variations that nonetheless fall within the scope of the present disclosure. For example, any of the steps described herein may optionally include an output to a user of information relevant to the step, and may thus represent an improvement in the user interface over existing art by providing information not otherwise available.

Similarly, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Similarly, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, once a user has provided their preferences for a new vehicle, the system may have to, in real time, search a specification space containing thousands of vehicles, and return the five or ten vehicles that most closely match the user's preferences, all within the span of less than one second, to avoid an impression of lag or latency on the part of the user. It is noted that such search engine functions, where large, multidimensional data spaces are searched in real time for sparse data, cannot practically be performed in the human mind, and that searches performed by a human, even given much longer timescales, typically return fewer and less relevant results.

Figure 2:
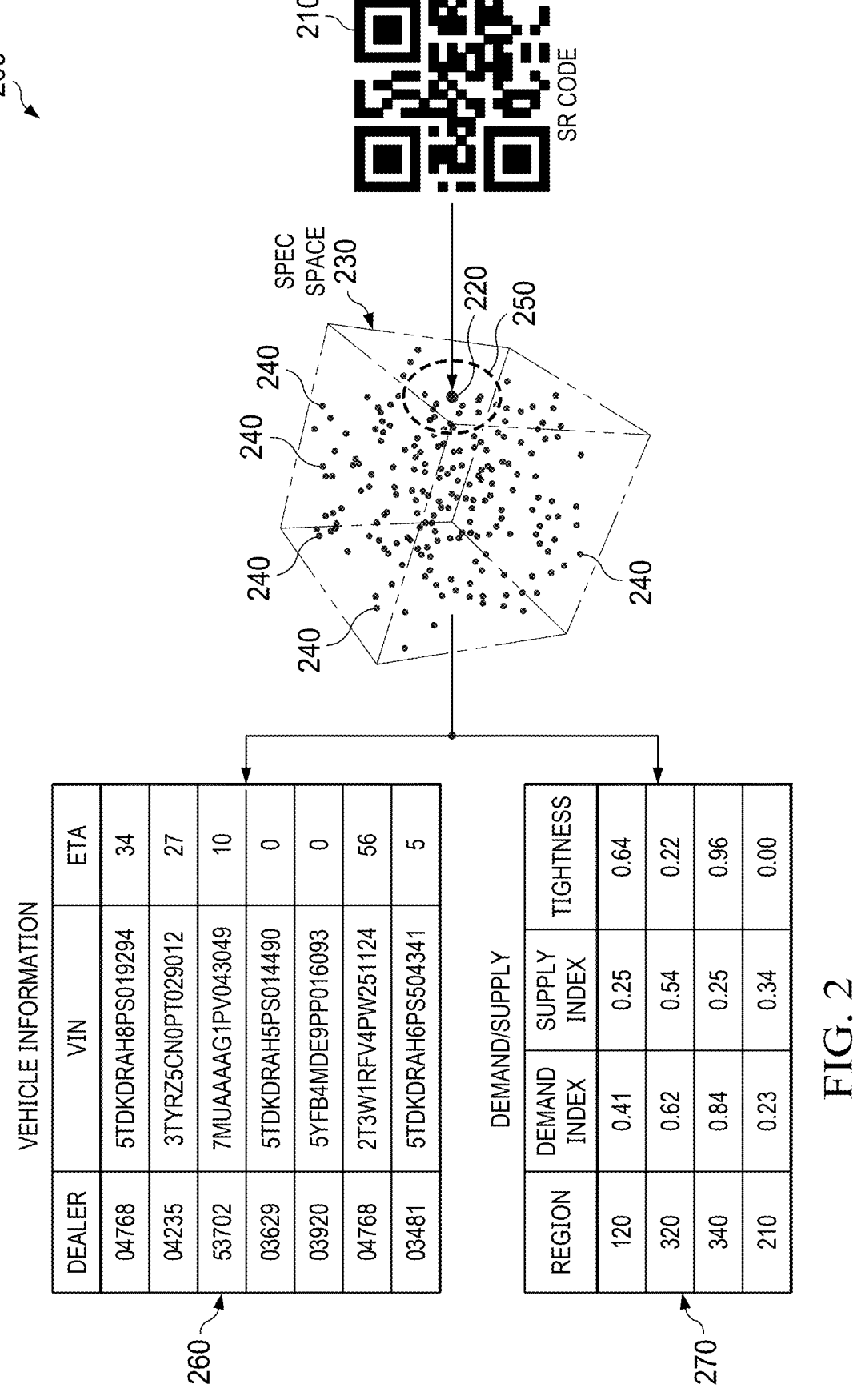
FIG. 2 is a schematic, diagrammatic representation of an example vehicle searching process, in accordance with at least one embodiment of the present disclosure.

FIG. 2 is a schematic, diagrammatic representation of an example vehicle searching process 200, in accordance with at least one embodiment of the present disclosure. In the example shown in FIG. 2, a new user-defined target specification 220 is represented as a specification record (SR) code 210, a two-dimensional barcode which encodes all of the customer's preferences for each specification, or "no preference" for specifications that are not important to the customer. For example, a customer may state (e.g., through the mobile application) that they firmly desire a given make and model of vehicle (e.g., a Toyota Prius), and mildly prefer a blue exterior and black interior, and weakly prefer leather seats. Other features, not specified by the user, may be listed as having no preference.

The target specification 220 is then mapped into a location or position vector in a multidimensional specification space 230, which may for example have one axis or dimension per vehicle option or specification. In the example shown in FIG. 2, the spec space 230 has only three dimensions, but it is understood that in practice it could have hundreds or even thousands of dimensions. Order change events may then trigger the spec encoder thus update the encoded vector.

The supply of available vehicles 240 is also mapped into the spec space 230, in such a way that similar vehicles are closer to one another in spec space 230, whereas dissimilar vehicles are farther from one another. An addition event (e.g., new vehicles arriving at a location) or deletion event (e.g., a vehicle being sold) may add or remove vehicles 240 from the spec space 230.

A neighborhood or match region 250 is defined around the target specification 220, and may for example be an ellipsoid whose diameter along any given dimension is defined by the weight given to that parameter, with strong preferences resulting in a small diameter and "no preference" resulting in a large or infinite diameter. A search of the spec space 230 may for example build a space partitioning tree on encoded spec vectors with these user-defined distance metrics, resulting in personalized matching using user defined preferences, target SR and inventory SR codes. This results in a list 260 of matching vehicles. The list 260 may for example include the dealer number, vehicle identification number (VIN), and estimated time of arrival (ETA) of each vehicle. For example, if the vehicle is located at the same dealership where the customer is currently shopping, then the ETA may be zero, whereas if the vehicle is located at a distant dealership, or is still in a manufacturer lot, then the ETA may be several days.

Also generated is a demand/supply table 270, which includes the regions in which matching vehicles are found, a demand index indicating demand in that region for vehicles within the target spec neighborhood 250, a supply index indicating supply in that region for vehicles within the target spec neighborhood 250, and a tightness score relating supply and demand within that region for vehicles within the target spec neighborhood. Calculation of the tightness score is described below in FIG. 6.

Figure 3:
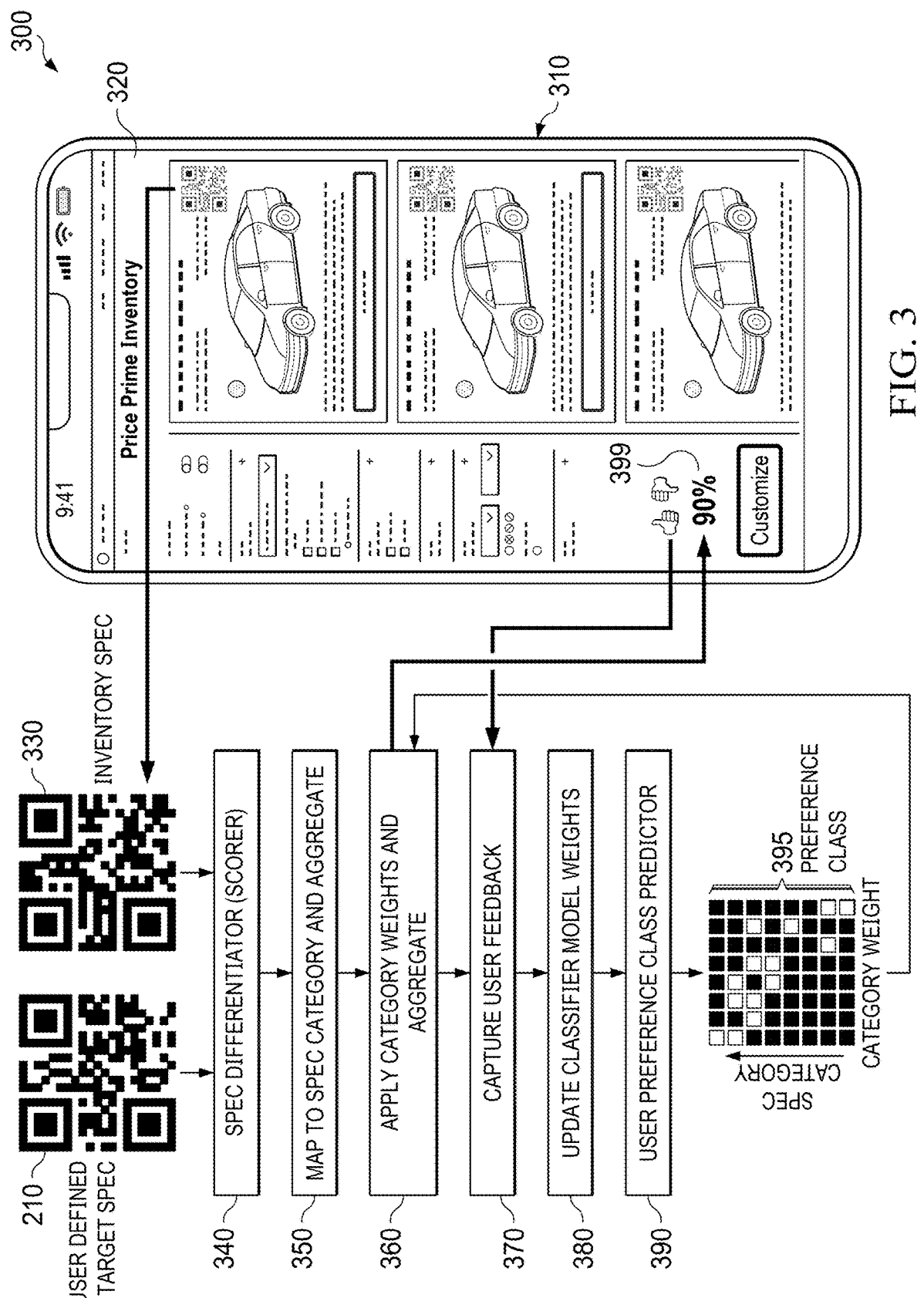
FIG. 3 is a schematic, diagrammatic representation of an example vehicle searching process, in accordance with at least one embodiment of the present disclosure.

FIG. 3 is a schematic, diagrammatic representation of an example vehicle searching process 300, in accordance with at least one embodiment of the present disclosure. In the example shown in FIG. 3, a new user-defined target specification 220 is constructed when the user answers questions via an application 320 running on a mobile device 310. The user-defined target specification 220 is then represented as an SR code 210, which encodes all of the customer's preferences for each specification, or "no preference" for specifications that are not important to the customer. Similarly, each available vehicle is represented as an inventory spec SR code 330. These specs 210, 330 are received by a spec differentiator or spec scorer 340, whose scores are then passed to a mapping block 350 and a weighting block 360. The scores 399 are then reported to the user via the app 320 (e.g., displayed on a screen, or otherwise).

The weighting block 360 makes use of a preference class 395, which is a vector containing a weight for each specification category (e.g., each axis of the multidimensional specification space), with larger weights indicating more importance and a zero value indicating low or zero importance. In the example shown in FIG. 3, The preference class is a matric with each row containing a binary value representing the weight for that spec category.

Initially, the preference class 395 may be a default preference class aggregated across all users. However, a user feedback block 370 can be used to allow the user to rate the suggested vehicle matches (e.g., a binary rating of yes/no, or a numerical score, etc.). This information can then be used to update the classifier model weights 380, which are fed to the user preference class predictor 390, and used to update the preference class 395. In an example, every time the user expresses a preference or non-preference for a given vehicle, the system can use this information to deduce the weighting the user is applying (whether consciously or otherwise) to each spec category.

Figure 4:
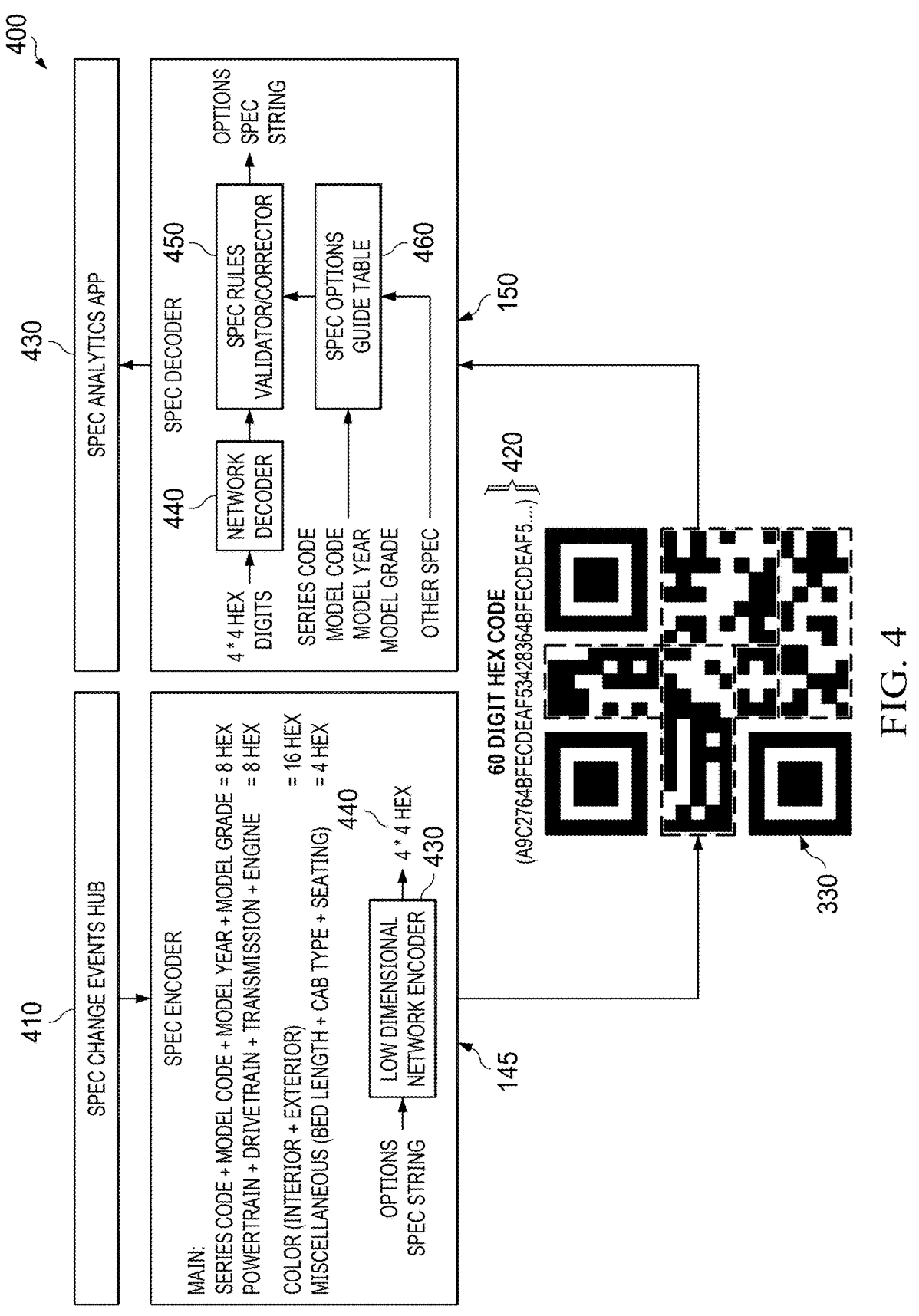
FIG. 4 is a schematic, diagrammatic representation of an example specification record (SR) code encoder/decoder, in accordance with at least one embodiment of the present disclosure.

FIG. 4 is a schematic, diagrammatic representation of an example specification SR code encoder/decoder 400, in accordance with at least one embodiment of the present disclosure. In the example shown in FIG. 4, the spec change events hub 410 sends a new vehicle specification (whether a demand spec or a supply/inventory spec) to the spec encoder 145, which encodes it as a 60-digit hexadecimal code or string 420 (e.g., 8 digits for series, model, year, and grade, 8 digits for power train, drive train, transmission, and engine, 16 digits for interior and exterior color, 4 digits for bed length, cab type, and seating, etc.). This string 420 is fed into a low-dimensional network encoder 430 to yield a 4×4 hexadecimal matrix 440, which can be represented as an SR code 221 or 330.

To decode, the 4×4 hexadecimal matrix is fed into a spec decoder 150, where a network decoder 440 unpacks it back into a 60-digit hexadecimal string. Lost information is then restored by a spec rules validator/corrector 450, which receives a spec options guide table 460 that contains information such as the series code, model code, model year, model grade, and other specifications as needed to restore the missing information.

It is noted that the spec encoder 145 and spec decoder 150 may reside on a user device, a dealer/manufacturer device, or both. Depending on the implementation, mapping of the target vehicle spec 210 and the inventory specs 330 into the multidimensional specification space may also be performed by the spec encoder.

Figure 5:
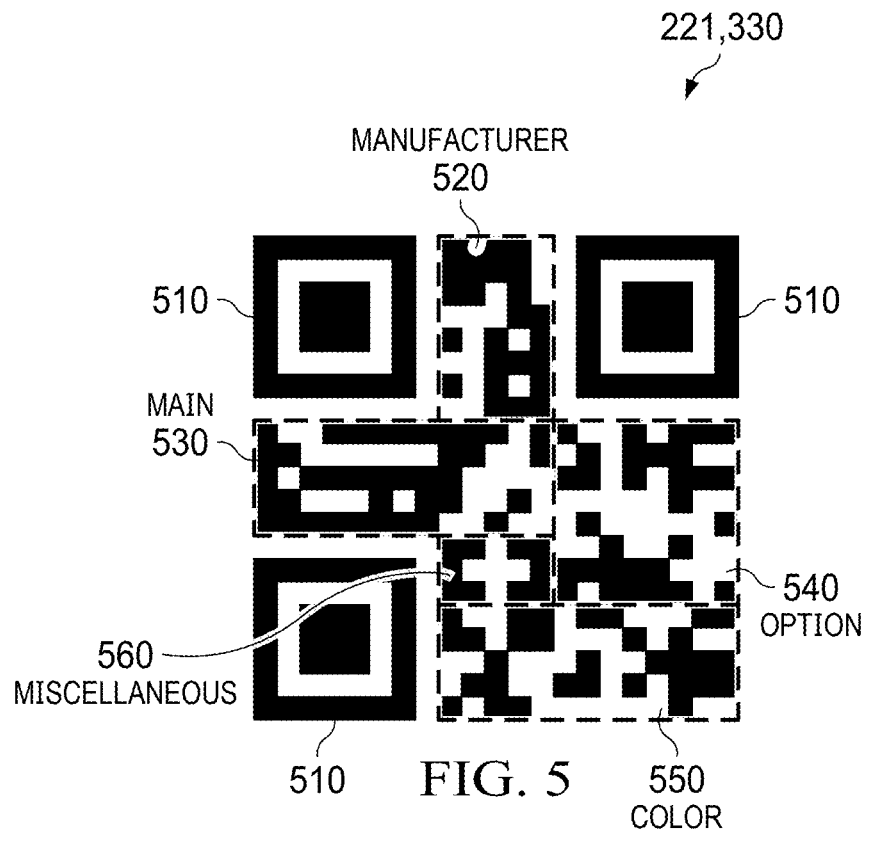
FIG. 5 is an example SR code, in accordance with at least one embodiment of the present disclosure.

FIG. 5 is an example SR code 221 or 330, in accordance with at least one embodiment of the present disclosure. In the example shown in FIG. 5, the SR code includes three corner markers 510, a manufacturer code region 520 for storing manufacturing related specifications, a main code region 530 for storing model, power train, drive train, transmission, engine related specifications, an option code region 540 for storing vehicle options, a color code region for storing vehicle exterior and interior colors, and a miscellaneous code region 560 for storing bed length, cab type and seating related specifications. It is understood that the regions 520, 530, 540, 550, and 560 may be of different dimensions or location than shown in FIG. 5, or that the information stored in the SR code 221, 330 may be organized differently than shown in FIG. 5, without departing from the spirit of the present disclosure.

Figure 6:
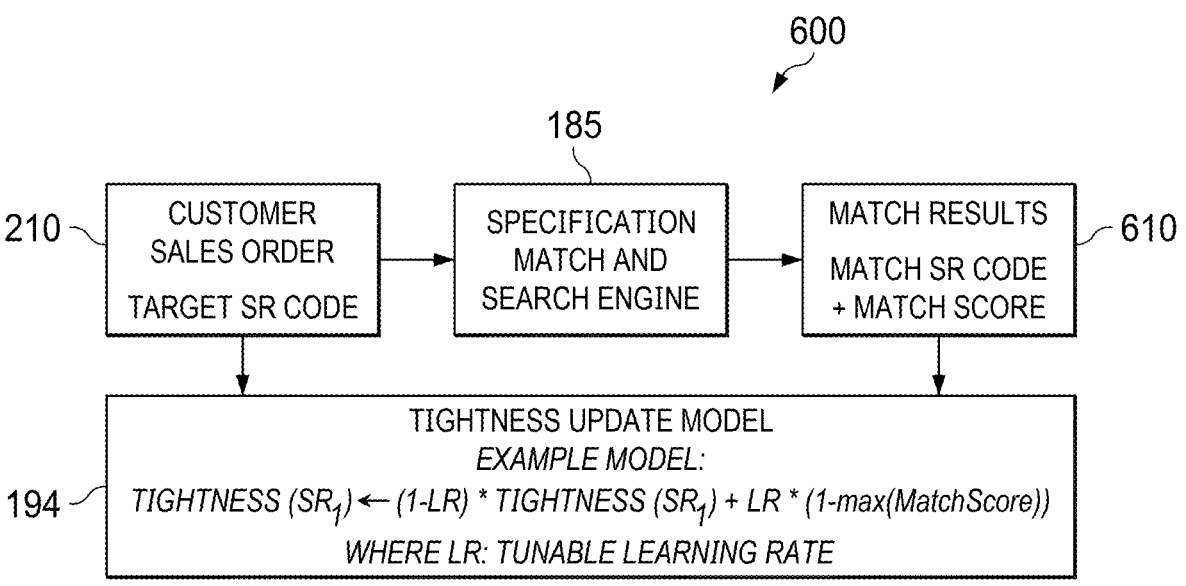
FIG. 6 is a schematic, diagrammatic representation, in block diagram form, of an example customer demand-supply tightness calculator, in accordance with at least one embodiment of the present disclosure.

FIG. 6 is a schematic, diagrammatic representation, in block diagram form, of an example customer demand-supply tightness calculator 600, in accordance with at least one embodiment of the present disclosure. In the example shown in FIG. 6, a customer sales order or target SR code 210 is fed into both a specification match and search engine 185 and a tightness update model 194. The specification match and search engine 185 produces match results 610, each of which includes a match SR code and a match score.

The tightness update model yields a tightness score for the target SR, where:

$$\text{Tightness}(SRt) = (1-LR)*\text{Tightness}(SRt) + LR*(1-\max(\text{MatchScore}))$$

<div align="right">EQN. 1</div> where LR is a tunable learning rate.

Thus, the tightness can be updated every time a new customer order 210 is received, or the vehicle inventory is updated (e.g., because new vehicles are shipped to a region). It is noted that there may be significant regional variation in the desirability of different vehicle models and options. For example, four-wheel drive (4WD) and all-wheel drive (AWD) may be more popular in regions where it snows, whereas a sunroof may be more popular in regions with plentiful sunshine and temperate weather.

If tightness for a particular vehicle configuration or spec category falls outside of a pre-defined acceptable range for a given region, the system may for example issue an alert, notifying dealers and/or manufacturers that there is a shortage of vehicles with the specified configuration or spec category within the specified region, or globally of the tightness is detected across multiple regions.

Figure 7:
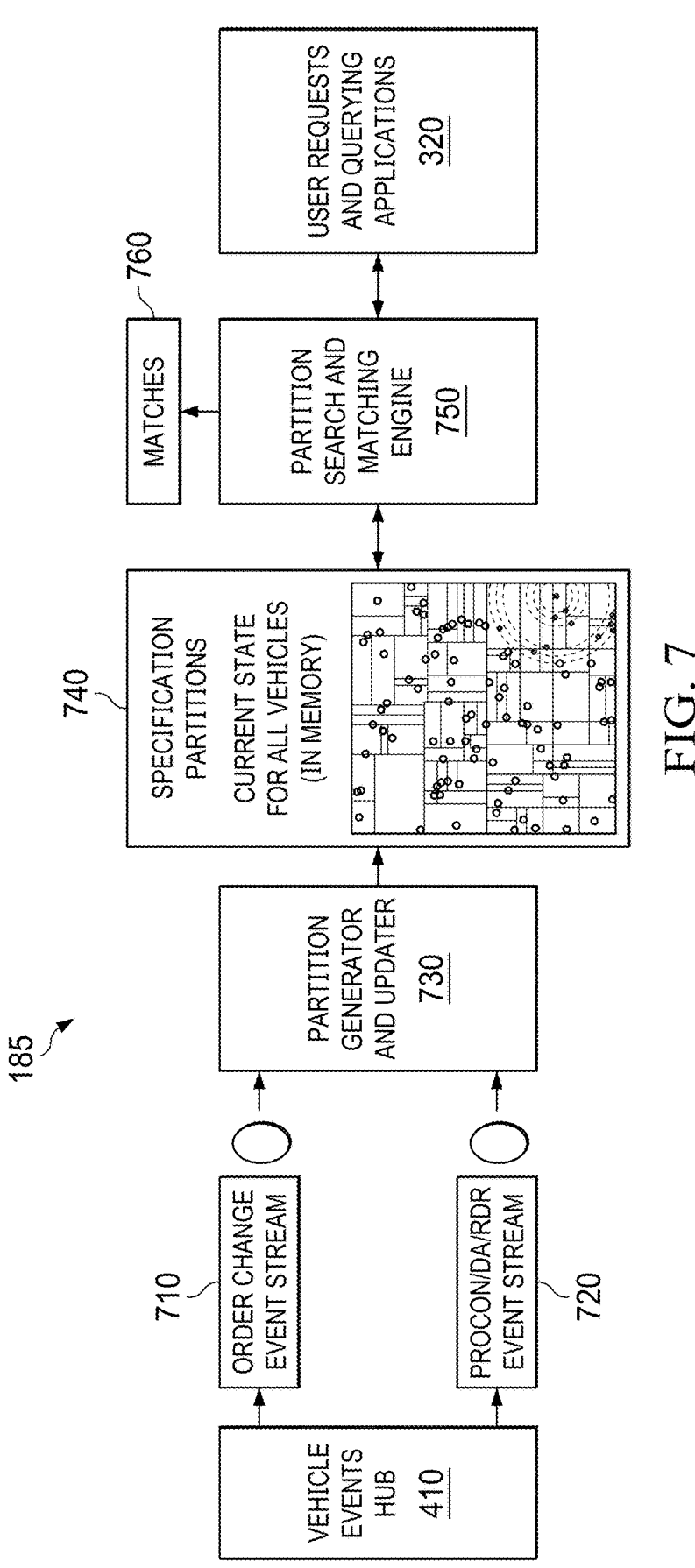
FIG. 7 is a schematic, diagrammatic representation, in block diagram form, of an example specification search and match engine, in accordance with at least one embodiment of the present disclosure.

FIG. 7 is a schematic, diagrammatic representation, in block diagram form, of an example specification search and match engine 185, in accordance with at least one embodiment of the present disclosure. In the example shown in FIG. 7, the specification search and match engine 185 includes a partition generator and updater 730, which receives an order change event stream 710 and a production confirmation/dealer allocation/retail delivery record (Procon/DA/RDR) event stream 720 from the vehicle spec change events hub 410. The partition generator and updater 730 generates specification partitions 740 in the specification space utilizing a tree-based space partitioning method to iteratively slice the space in each dimension in two nearly equally populated partitions every iteration. During the search process, this partitioning helps direct the algorithm in a direction where it is most likely to find specifications which are similar to the queried specification, and is used by the partition search and matching engine 750 to identify matches 760 in response to user requests 210 from a querying application 320.

Figure 8A:
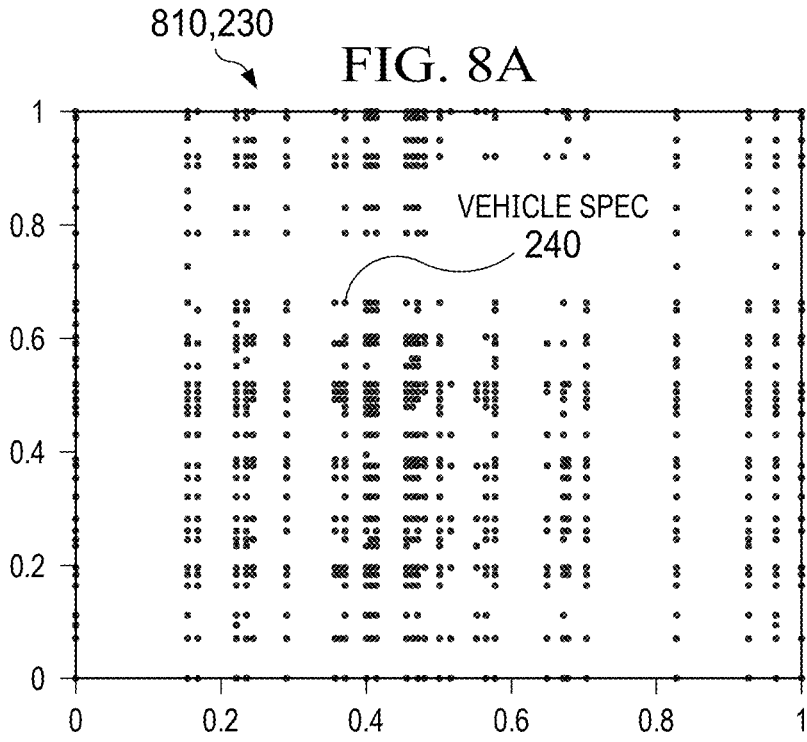
FIG. 8A is a two-dimensional slice or projection of the vehicle specs in the multidimensional spec space, with each axis representing a particular spec category (e.g., exterior color and interior color), in accordance with at least one embodiment of the present disclosure.

FIG. 8A is a two-dimensional slice or projection 810 of the vehicle specs 240 in the multidimensional spec space 230, with each axis representing a particular spec category (e.g., exterior color and interior color), in accordance with at least one embodiment of the present disclosure. Each dot or vehicle spec 240 within the slice or projection represents a vehicle in the current dealer/manufacturer inventory.

Figure 8B:
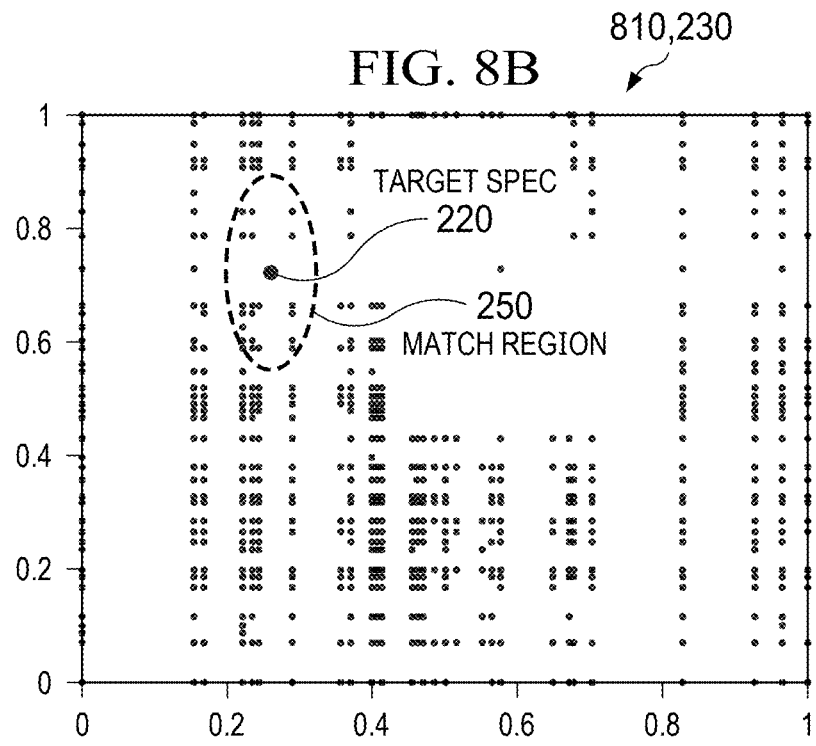
FIG. 8B is a two-dimensional slice or projection of the vehicle specs in the multidimensional spec space, in accordance with at least one embodiment of the present disclosure.

FIG. 8B is a two-dimensional slice or projection 810 of the vehicle specs 240 in the multidimensional spec space 230, in accordance with at least one embodiment of the present disclosure. Each dot within the slide or spec represents a vehicle in the current dealer/manufacturer inventory. A target spec 220 is defined as a location within the slice or projection 810 of the spec space 230, and a match region or target neighborhood 250 defines the vehicles that are considered close enough to meet the customer's desires, as defined by the target spec 220 and the weights defined in the preference class 395 (see FIG. 3). Within the 2-dimensional slice or projection 810, the diameters or semimajor axes of the match region or target neighborhood 250 are a function of the weights in the preference class 395, as described above.

Figure 9:
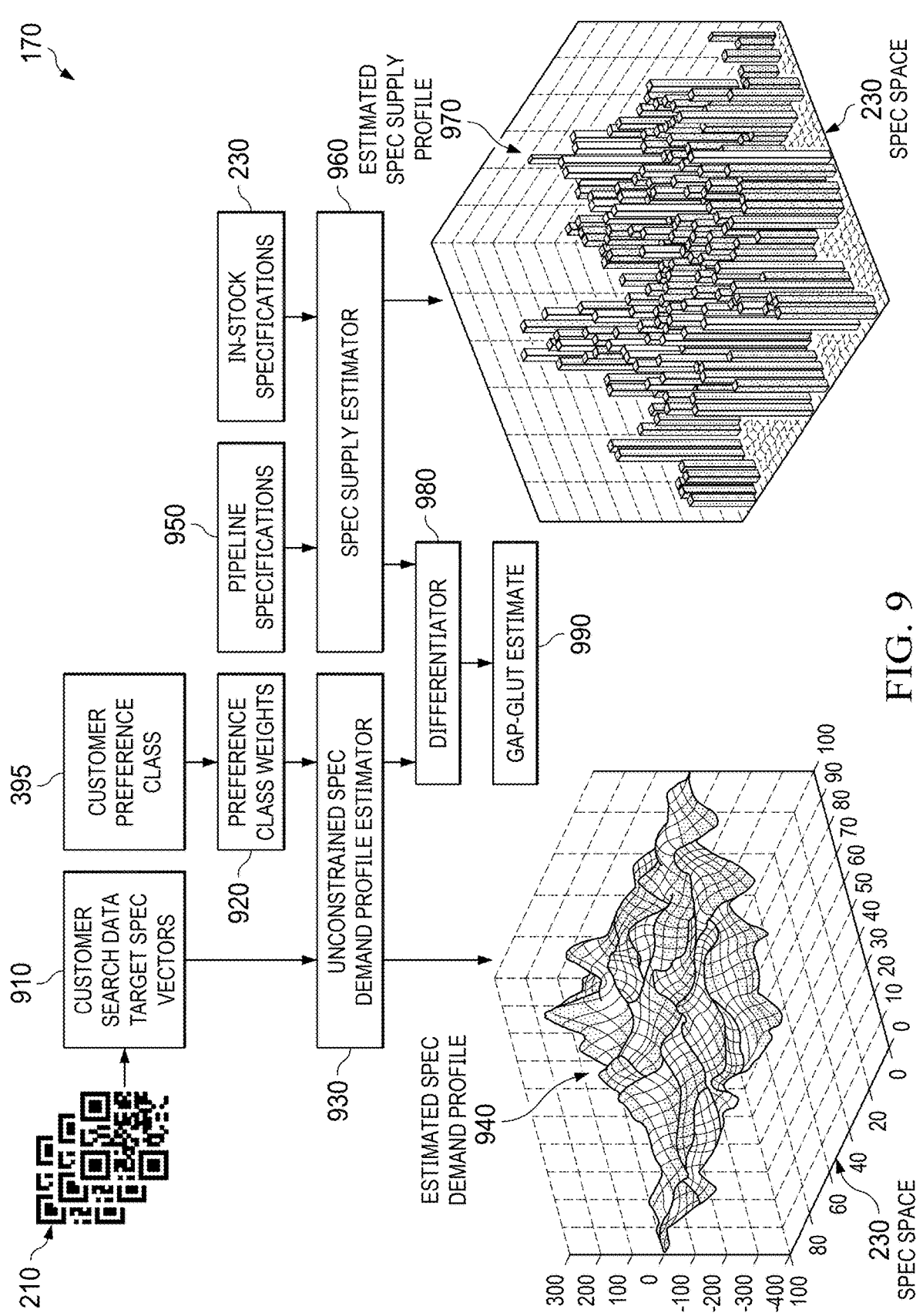
FIG. 9 is a schematic, diagrammatic representation of an example gap-glut analyzer, in accordance with at least one embodiment of the present disclosure.

FIG. 9 is a schematic, diagrammatic representation of an example gap-glut analyzer 170, in accordance with at least one embodiment of the present disclosure. In the example shown in FIG. 9, customer search data target spec vectors 910 are extracted from a plurality of customer target spec SR codes 210, and are fed into an unconstrained spec demand profile estimator 930, along with customer preference class weights 920, which are extracted from the customer preference class 395. The unconstrained spec demand profile estimator 930 then produces an estimated spec demand profile 940 in the multidimensional spec space 230, where each occupied point in the spec demand profile 940 represents a vehicle desired by a customer. The spec demand profile 940 may be represented as a surface in the multidimensional spec space 230.

In parallel, in-stock vehicle specifications 230 (e.g., SR codes for vehicles in inventory) and pipeline specifications 950 (e.g., SR codes for vehicles in transit or production) are fed to a spec supply estimator 960, which produces an estimated spec supply profile 970 in the multidimensional spec space 230, where each occupied point in the spec supply profile 970 represents a vehicle currently in inventory or expected to soon be in inventory. The spec supply profile 970 may be represented as a surface in the multidimensional spec space 230.

The estimated spec demand profile 940 and the estimated spec supply profile 970 are fed to a differentiator 980, which looks at the difference or distance between the spec demand profile 940 and the spec supply profile 970. Any points in the spec supply profile 970 for which there are no nearby points in the spec demand profile 940 represent "glut" vehicles, for which there is supply but no demand. Similarly, any points in the demand supply profile 940 for which there are no nearby points in the spec supply profile 970 represent "gap" vehicles, for which there is demand but no supply. This information is captured in a gap-glut estimate 990. In an example, the dealer or manufacturer may choose to discount glut vehicles in order to increase demand. This may be particularly useful in implementations where price is a highly weighted customer preference, such that if there is low demand for, e.g., white vehicles, the demand can be increased by dropping the price of white vehicles. It may also be desirable to decrease the number of undesired vehicles being manufactured.

Similarly, the dealer may choose to order, and/or the manufacturer may choose to manufacture, gap vehicles to address the unmet demand (e.g., request changes to the existing vehicle inventory). For example, if there is high demand and limited supply for red vehicles, the manufacturer may choose to manufacture more red vehicles, or to repaint existing vehicles whose colors are in low demand, or to raise the price of red vehicles in order to reduce the demand-supply gap. In some embodiments, these actions may be recommended by and/or performed automatically by the goal maximizer 180 of FIG. 1.

Figure 10:
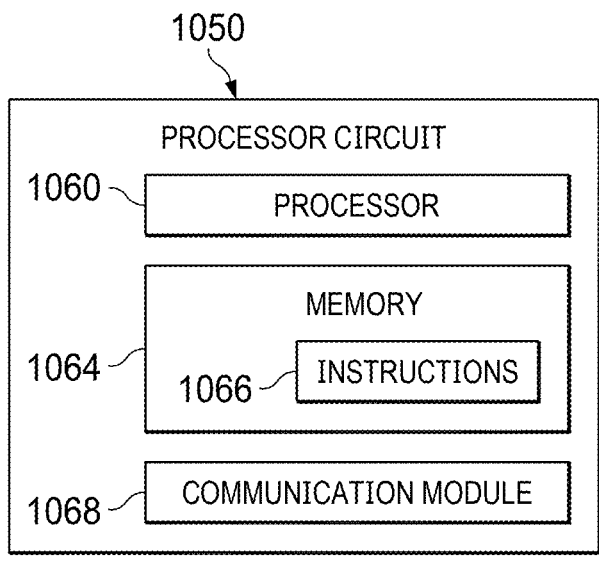
FIG. 10 is a schematic diagram of a processor circuit, in accordance with at least one embodiment of the present disclosure.

FIG. 10 is a schematic diagram of a processor circuit 1050, in accordance with at least one embodiment of the present disclosure. The processor circuit 1050 may be implemented in the system 105, the system 1100, the mobile device 310, or other devices or workstations (e.g., third-party workstations, network routers, etc.), or on a cloud processor or other remote processing unit, as necessary to implement the method. As shown, the processor circuit 1050 may include a processor 1060, a memory 1064, and a communication module 1068. These elements may be in direct or indirect communication with each other, for example via one or more buses.

The processor 1060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1060 may also comprise another hardware device, a firmware device, or any combination thereof configured to perform the operations described herein. The processor 1060 may also be implemented as a combination of computing devices, e.g., a combination of a DSP and a microprocessor, a plurality of microprocessors, one or more microprocessors in conjunction with a DSP core, or any other such configuration.

The memory 1064 may include a cache memory (e.g., a cache memory of the processor 1060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1066. The instructions 1066 may include instructions that, when executed by the processor 1060, cause the processor 1060 to perform the operations described herein. Instructions 1066 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1068 can include any electronic circuitry and/or logic circuitry to facilitate direct or indirect communication of data between the processor circuit 1050, and other processors or devices. In that regard, the communication module 1068 can be an input/output (I/O) device. In some instances, the communication module 1068 facilitates direct or indirect communication between various elements of the processor circuit 1050 and/or the system 105. The communication module 1068 may communicate within the processor circuit 1050 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or communication between a user device and a dealer/manufacturer device, may be accomplished using any suitable wireless or wired communication technology, such as a cable interface such as a universal serial bus (USB), micro USB, Lightning, or Fire-Wire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 11:
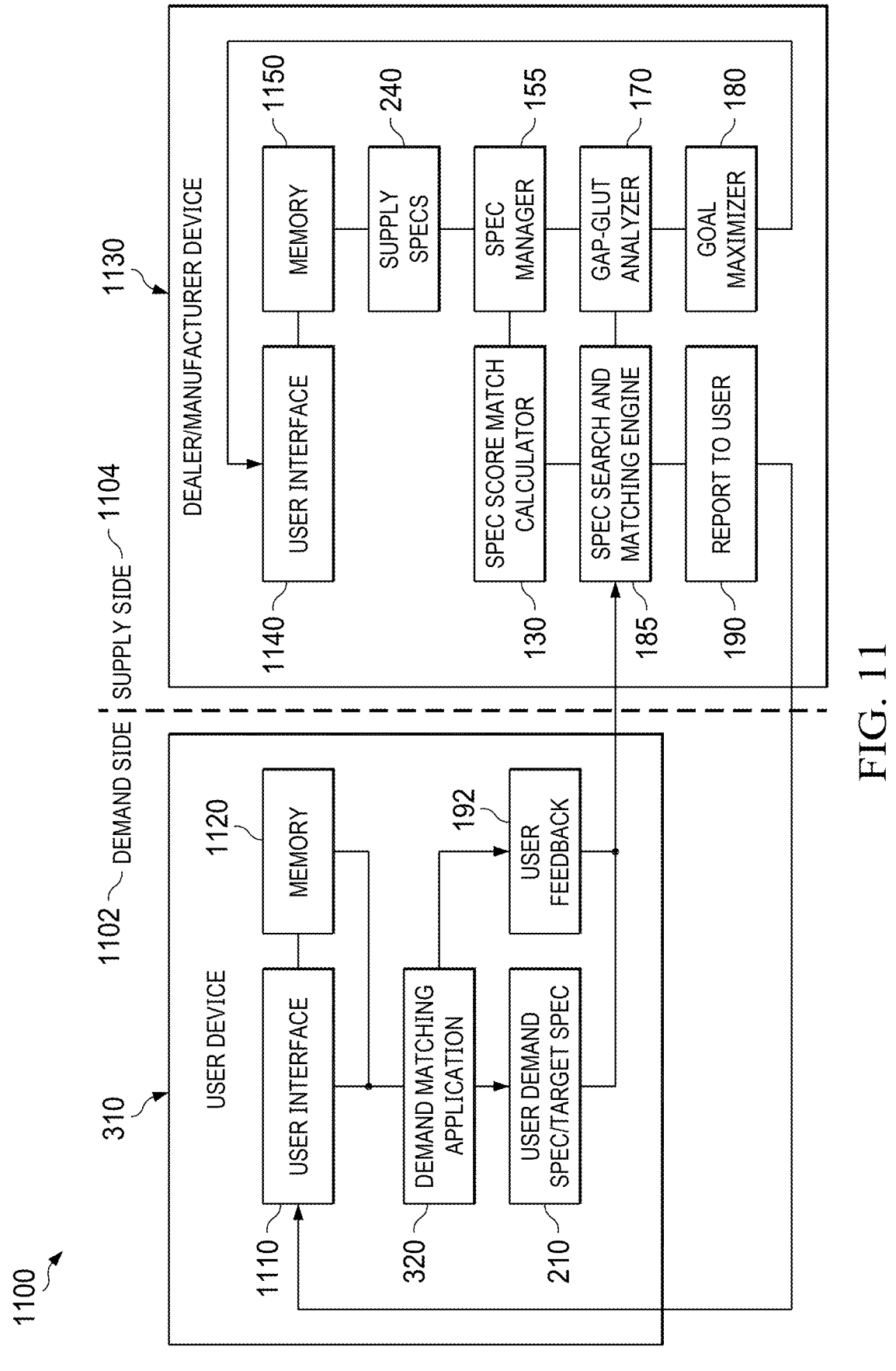
FIG. 11 is a schematic, diagrammatic representation, in block diagram form, of an example vehicle supply management system, in accordance with at least one embodiment of the present disclosure.

FIG. 11 is a schematic, diagrammatic representation, in block diagram form, of an example vehicle supply management system 1100, in accordance with at least one embodiment of the present disclosure. The system 1100 includes elements on a demand side 1102 which includes a user device 310, and a supply side 1104 which includes a dealer/manufacturer device 1130.

The user device 310 includes a user interface 1110, memory 1120, and a demand matching application 320. The demand matching application 320 receives inputs from the user, via the user interface 1110, and produces the user demand spec or target spec 210, as well as user feedback 192 (e.g., via a user feedback module) on the desirability of matched vehicles, both of which are communicated to a spec search and matching engine 185 on the dealer/manufacturer device 1130.

The dealer/manufacturer device 1130 includes a user interface 1140 and memory 1150. Operatively stored within the memory 1150 are the supply specs 240 (e.g., within a supply specs database), spec manager 155, spec score match calculator 130, gap-glut analyzer 170, and goal maximizer 180. The goal maximizer 180 may for example provide a report that is viewable or otherwise accessible via the user interface 1140.

The spec searching and matching engine 185 and reporting 190 are shown in FIG. 11 as executing on the dealer/manufacturer device 1130 (e.g., when triggered by the demand matching application 320). However, in some embodiments, these blocks, or portions thereof, may execute on the user device 310.

It is noted that the user device or customer device 310 and the dealer device or manufacturer device 1130 may be in network communication with one another, e.g., via a wireless Internet or cellular connection, and may thus not need to be in proximity to one another.

FIG. 12 is a schematic, diagrammatic representation, in flow diagram form, of an example vehicle matching method 1200, in accordance with at least one embodiment of the present disclosure. The method 1200 may be performed in real time.

In block 1210, the method 1200 includes storing a plurality of inventory specifications of a respective plurality of available vehicles. Execution then proceeds to block 1220.

In block 1220, the method 1200 includes, based on inputs from the user, generating a target vehicle specification. Execution then proceeds to step 1230.

In block 1230, the method 1200 includes mapping the target vehicle specification and the plurality of inventory specifications into a multidimensional specification space that includes one dimension for each specification category of the target vehicle specification. Execution then proceeds to step 1230.

In block 1240, the method 1200 includes storing a respective weight for each dimension of the multidimensional specification space. These weights may be based at least in part on the inputs from the user. For example, if the user states an order of preference for spec categories within the target vehicle spec, then this order can be used to define the weights. Execution then proceeds to step 1230.

In block 1250, the method 1200 includes, based on the weights for each dimension of the multidimensional space, defining a search neighborhood around the target vehicle specification in the multidimensional specification space. Execution then proceeds to step 1230.

In block 1260, the method 1200 includes identifying those inventory specifications, of the plurality of inventory specifications, that fall within the search neighborhood. Execution then proceeds to step 1230.

In block 1270, the method 1200 includes, for each identified inventory specification within the search neighborhood, reporting, to the user, the available vehicle corresponding to the identified inventory specification. The method 1200 is now complete.

As will be readily appreciated by those having ordinary skill in the art after becoming familiar with the teachings herein, the vehicle supply management system disclosed herein adds at least the following capabilities to existing vehicle supply chains:

1. The ability to efficiently encode and decode vehicle specifications in a convenient, information-dense, machine-readable format.

2. The ability to effectively store, consume and transmit vehicle specification data.

3. The ability to capture user preferences and utility functions in the specification space, and classify them accordingly.

4. The ability to partition specification space for efficient search, matching and comparing.

5. The ability to apply class-based and spec-category-based weights to compute a personalized match score between a given vehicle specification and user defined target specification.

6. The ability to obtain user feedback on the match results, and update the class prediction model (e.g., the weights) and the classifier outputs accordingly.

7. The ability to compute customer preference and specification level tightness of demand and supply.

8. The ability to manage and control the matching and search function to ascertain whether tightness values lie within a pre-specified range.

9. The ability to leverage user-defined target specifications to estimate specification demand profiles.

10. The ability to compute and estimate gap and glut over the specification space by applying class-specific weights defined neighborhood skewness. In some embodiments, the neighborhood does not have to be symmetric in every direction. Rather, the skewness can be defined by the customer preferences and utilities along one direction over another. This skewness is reflected into the gap and glut estimates by biasing the gap or glut in a direction that is more preferred by the customers.

11. The ability to dynamically adjust the supply pool through change of order specifications to minimize expected gap-glut, regional tightness and/or achieving a given business objective over the planning period.

Accordingly, it can be seen that the vehicle supply management system fills a long-felt need in the art, by providing user-friendly tools that help customers find the right vehicle and help dealers and manufacturers adjust their supply to meet demand.

A number of variations are possible on the examples and embodiments described above. For example, tightness, match scores, and gap-glut estimates may be calculated differently than described herein. SR codes may be replaced with QR codes, bar codes, hexadecimal strings, or other machine-readable or human-readable codes representing the target spec and supply specs. The encoding scheme (e.g., number of digits, etc.) may be different than described herein, without departing from the spirit of the present disclosure.

The logical operations making up the embodiments of the technology described herein are referred to variously as operations, steps, blocks, objects, elements, components, or modules. Furthermore, it should be understood that these may occur or be performed or arranged in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle supply management system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the vehicle supply management system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system comprising:

a first processor operatively coupled to a memory comprising:

a user application configured to, based on inputs from a user, generate a target vehicle specification;

a second processor operatively coupled to a second memory comprising:

a database comprising a plurality of inventory specifications of a respective plurality of vehicles in a vehicle inventory;

a spec encoder configured to:

encode the target vehicle specification as a first code;

encode the plurality of inventory specifications as a plurality of respective second codes; and map the target vehicle specification and the plurality of inventory specifications into a multidimensional specification space, wherein the multidimensional specification space includes one dimension for each specification category of the target vehicle specification;

a preference class vector comprising a respective weight for each dimension of the multidimensional specification space; and a matching engine configured to:

based on the preference class vector, define a search neighborhood around the target vehicle specification in the multidimensional specification space;

identify inventory specifications of the plurality of inventory specifications that fall within the search neighborhood; and for each identified inventory specification:

compute a match score; and report, to the user, the match score and the vehicle corresponding to the identified inventory specification.

2. The system of claim 1, wherein the first code and the plurality of second codes are SR codes.

3. The system of claim 1, wherein the first code and the plurality of second codes are hexadecimal strings.

4. The system of claim 1, wherein the specification categories of the target vehicle specification include at least one of an exterior color, an interior color, an engine type, a transmission type, an accessory, or a trim package.

5. The system of claim 1, further comprising a user feedback module configured to:

receive user feedback regarding the vehicles corresponding to the identified inventory specifications; and based on the user feedback, update the preference class vector.

6. The system of claim 1, further comprising a specification manager configured to, based on changes in the vehicle inventory, update the database comprising the plurality of inventory specifications.

7. The system of claim 1, further comprising a tightness updater configured to:

based on the mapped target vehicle specification, the mapped plurality of inventory specifications, and the search neighborhood, compute a tightness for the target vehicle specification; and report the tightness to the user, or to a dealer or manufacturer.

8. The system of claim 1, further comprising gap glut analyzer configured to:

based on a plurality of target vehicle specifications and the plurality of inventory specifications, compute a gap-glut estimate; and report the gap-glut estimate to a dealer or manufacturer.

9. The system of claim 8, further comprising a goal maximizer configured to, based on the gap-glut estimate:

request changes to the vehicle inventory; or adjust prices of at least some vehicles in the vehicle inventory.

10. The system of claim 1, wherein the user application is a smartphone application or web application.

11. A non-transitory computer-readable medium containing instructions which, when executed by at least one processor, perform operations which include:

with a user application executing on a first processor, based on inputs from a user, generating a target vehicle specification;

with a database stored in a memory of a second processor, storing a plurality of inventory specifications of a respective plurality of vehicles in a vehicle inventory;

with a spec encoder executing on the second processor:

encoding the target vehicle specification as a first code;

encoding the plurality of inventory specifications as a plurality of respective second codes; and mapping the target vehicle specification and the plurality of inventory specifications into a multidimensional specification space, wherein the multidimensional specification space includes one dimension for each specification category of the target vehicle specification;

with a preference class vector stored in the memory, storing a respective weight for each dimension of the multidimensional specification space;

with a matching engine:

based on the preference class vector, defining a search neighborhood around the target vehicle specification in the multidimensional specification space;

identifying inventory specifications of the plurality of inventory specifications that fall within the search neighborhood; and for each identified inventory specification:

computing a match score; and reporting, to the user, the match score and the vehicle corresponding to the identified inventory specification.

12. The non-transitory computer-readable medium of claim 11, wherein the first code and the plurality of second codes are SR codes.

13. The non-transitory computer-readable medium of claim 11, wherein the first code and the plurality of second codes are hexadecimal strings.

14. The non-transitory computer-readable medium of claim 11, wherein the specification categories of the target vehicle specification include at least one of an exterior color, an interior color, an engine type, a transmission type, an accessory, or a trim package.

15. The non-transitory computer-readable medium of claim 11, wherein the instructions further comprise, with a user feedback module:

receiving user feedback regarding the vehicles corresponding to the identified inventory specifications; and based on the user feedback, updating the preference class vector.

16. The non-transitory computer-readable medium of claim 11, wherein the instructions further comprise, with a specification manager, based on changes in the vehicle inventory, updating the database comprising the plurality of inventory specifications.

17. The non-transitory computer-readable medium of claim 11, wherein the instructions further comprise, with a tightness updater:

based on the mapped target vehicle specification, the mapped plurality of inventory specifications, and the search neighborhood, computing a tightness for the target vehicle specification; and reporting the tightness to the user, or to a dealer or manufacturer.

18. The non-transitory computer-readable medium of claim 11, wherein the instructions further comprise, with a gap glut analyzer:

based on a plurality of target vehicle specifications and the plurality of inventory specifications, computing a gap-glut estimate; and reporting the gap-glut estimate to a dealer or manufacturer.

19. The non-transitory computer-readable medium of claim 18, wherein the instructions further comprise, with a goal maximizer, based on the gap-glut estimate:

requesting changes to the vehicle inventory; or adjusting prices of at least some vehicles in the vehicle inventory.

20. A computer implemented method, comprising, in real time, with a first processor comprising a memory:

defining a vehicle specification format comprising a plurality of specification categories;

defining a specification code format comprising at least one digit for each specification category of the plurality of specification categories;

receiving, from a second processor, a vehicle specification in the vehicle specification format;

mapping the vehicle specification into a multidimensional specification space, wherein the multidimensional specification space includes one dimension for each specification category of the vehicle specification;

identifying a second vehicle specification proximate to the vehicle specification in the multidimensional space;

mapping the second vehicle specification into the specification code format;

representing the mapped second vehicle specification as a two-dimensional SR code;

storing the two-dimensional SR code;

receiving a user request; and based on the user request, electronically transmitting the two-dimensional SR code to the second processor.

* * * * *